May 28, 1929.  F. J. OSBORN ET AL  1,715,246

FRAME FOR MOTOR CYCLES AND LIKE VEHICLES

Filed May 21, 1928  2 Sheets-Sheet 1

Inventors:
Frederick J. Osborn
Norman F. Wood
by Richard E. Babcock
Attorney

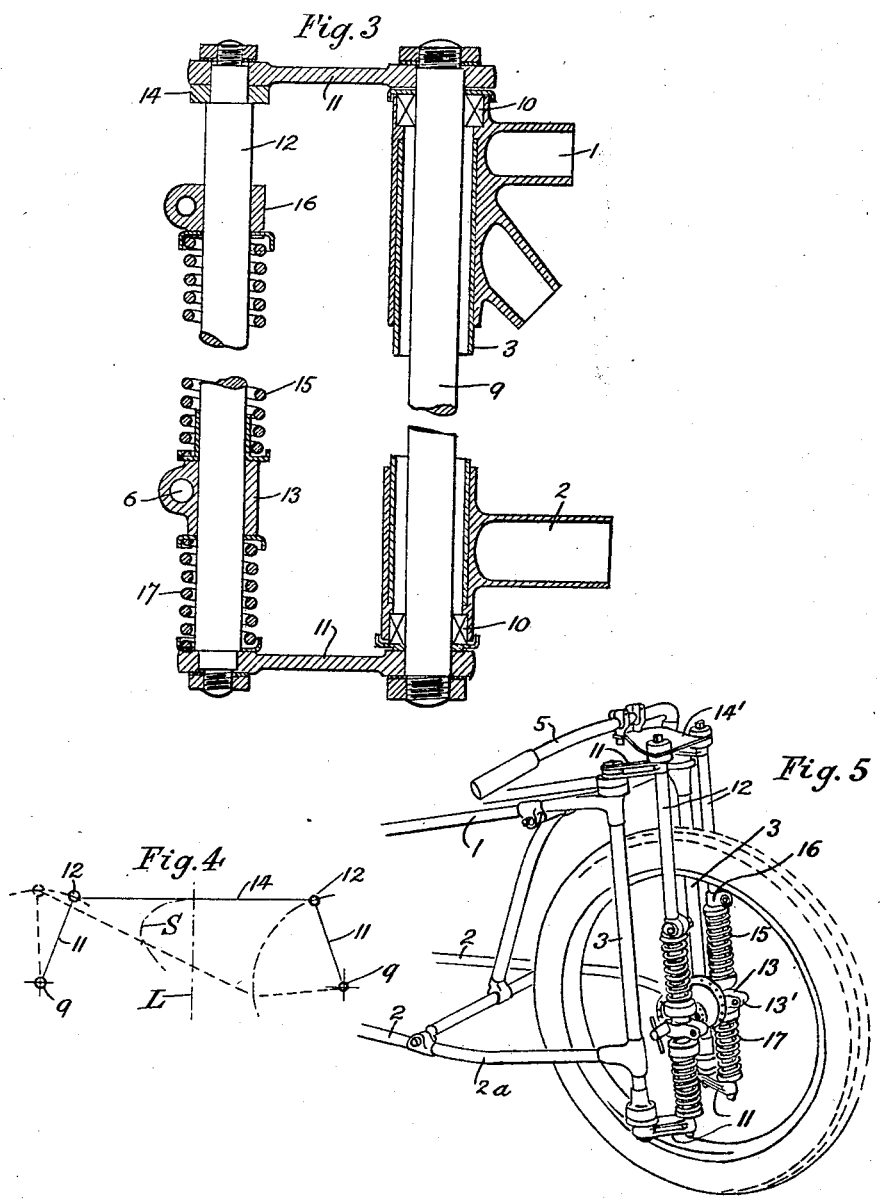

Patented May 28, 1929.

1,715,246

UNITED STATES PATENT OFFICE.

FREDERICK JOHN OSBORN AND NORMAN FREDERICK WOOD, OF GOSPORT, ENGLAND.

FRAME FOR MOTOR CYCLES AND LIKE VEHICLES.

Application filed May 21, 1928, Serial No. 279,590, and in Great Britain May 4, 1927.

This invention relates to frames for motor cycles and like vehicles, particularly vehicles having one steering wheel such as bicycles and tricycles, and more particularly to that type of frame known as duplex, consisting of two substantially triangular frames placed side by side and connected by cross bracing. The invention further relates to the method of steering such a vehicle, said steering method being particularly suitable to a frame constructed according to the present invention. It is an object of the invention to secure greater strength and rigidity for the frame, whilst further objects are to improve steering qualities by rendering steering easier and with less wear on the tyre, and substantially to dispense with a front fork, at least to dispense with front wheel carrying means in any way approaching or resembling the usual type of fork.

Figure 1:
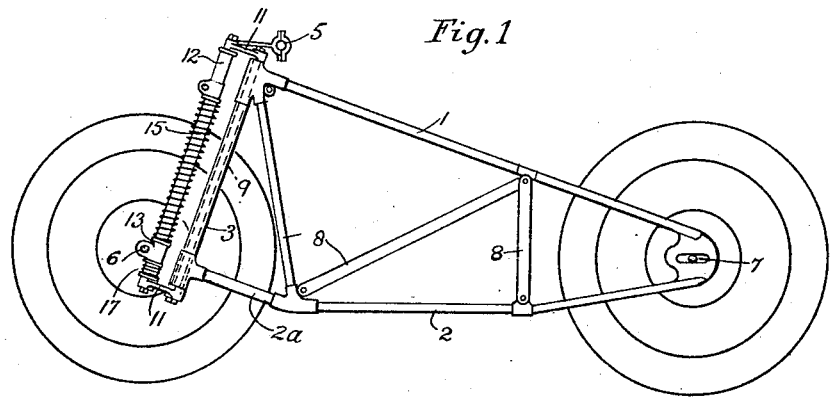
Figure 2:
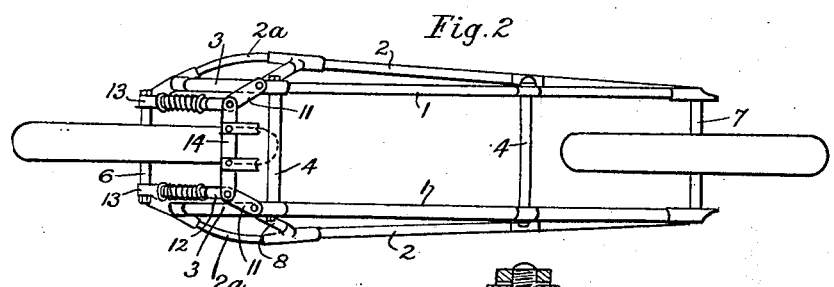
Figure 3A:
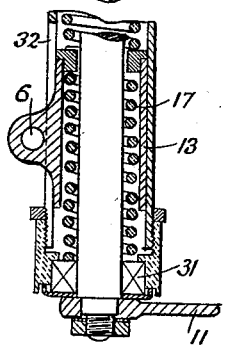

In the accompanying drawings, Fig. 1 is a side elevation of a motor cycle frame according to this invention, Fig. 2 is a plan thereof, Fig. 3 a vertical section of the steering and springing arrangement, Fig. 3ª is a modification of Fig. 3, Fig. 4 a plan diagram illustrating the principle adopted for the steering, and Fig. 5 is a perspective view of the front portion of a motor cycle.

A frame for a motor cycle according to the invention (Figs. 1 and 2) comprises a pair of top members 1, a pair of bottom members 2, and a pair of steering heads 3, forming two substantially triangular frames placed side by side and connected by cross bracing 4. As shown in Fig. 1, the steering heads 3 extend substantially from the handle bars 5 to a point near the front axle 6, and each forms one side of each triangular frame construction, while the members 1 and 2 form respectively the other sides and are united near the rear axle 7. Fig. 1 also shows the bottom member 2 somewhat curved or made up of shorter portions not quite in line, whereby with the tie-rods or struts 8 the whole substantially triangular structure is made up of a number of smaller triangles.

Inside each steering head 3 is a steering column 9 carried in a bearing 10 at each end of the steering head, shown more clearly in Fig. 3. Secured to each end of the steering column 9 and extending forwardly therefrom are links 11, the forward ends of which are connected by and rigidly secured to a tie-rod 12. Steering columns 9, links 11, and tie-rods 12, thus form a pair of rigid frames which can swing about the steering heads 3 as axes. Sliding on the tie-rods 12 are lugs 13 which carry the front axle 6, the latter rigidly connecting the lugs and forming therewith a pivotal cross connection between the tie rods at a point near their lower ends. The upper ends of the tie-rods are pivotally connected by a link 14 to which are secured in appropriate manner the handle bars 5. Springs 15 surrounding the tie-rods 12 resiliently transmit the load on the frame to the front axle 6, the springs bearing between the sliding lugs 13 and lugs 16 adjustable lengthways on and clamped to the tie-rods. Rebound springs 17 also are preferably fitted between lugs 13 and the lower ends of the tie-rods.

The tie-rods 12 are closer together than the steering columns 9, and by reference to Fig. 4, which diagrammatically shows in plan in full lines the central position of the above described linkwork, it will be seen that angular swinging of links 11 about centres 9 (for instance to the dotted position) results in angular displacement of the link 14 with reference to the center line L of the frame. Axle 6 and the front wheel are, of course, similarly angularly displaced, hence steering occurs. Swinging of the links 9 will be effected by swinging the link 14 by means of the handle bars. The dotted line S, Fig. 4, shows the path traversed by the central point of the link 14 when being swung as above, and a similar path will be followed by the mid-point of the front axle and the point of contact of the wheel with the ground. Such a steering method is known, but by extending the links forwardly from steering columns of normal rearward rake, it has been found that the motion so obtained results in practically no wheel trail, and hence in less wear on the tyre. A further advantage of the new arrangement is that the springs remain always directly over the ends of the front axle, and hence in the line of load at all positions of the steering.

With the above described arrangement the front wheel lies between the steering heads of the two frames, and in order to allow sufficient angular movement of the wheel for steering purposes, the front portions 2ª of the bottom frame members 2 are bowed outwards as shown in Figs. 2 and 5.

Whilst this frame construction and steering has been specifically described in its preferred form as applied to a motor cycle, it will be readily understood that the arrangement is equally applicable to any wheel which has to be steered.

It is equally clear that instead of the arrangement in which the springs 15 surround the tie-rods 12, the axle 6 may be carried by links pivoted to the lugs 13, which are in this case fixed endways on the rods 12, and known springing means for a link-mounted axle employed. Bridging means may also be employed in addition to the axle itself for connecting together the axle carrying lugs 13.

Fig. 5 shows minor constructional modifications; for example the top cross link 14 is replaced by a plate 14' to which the handle bars 5 are secured directly; links 11 are formed double, and lugs 13 are provided with extensions 13' for the attachment of shock absorbing frictional dampers or the like.

A further modification of the springing arrangement is shown in Fig. 3ᵃ, being similar to that shown in Fig. 3 except that the springs are internal. In this case a sleeve 30 surrounds the springs 15 and 17, and is carried by bearings 31 at each end of the tie-rods 12 so as to be rotatable thereon. The axle carrying lug 13 slides within the sleeve 30 instead of on tie-rod 12, the rebound spring 17 being located in the annular space between the lug and tie-rod. The axle carrying portion of the lug extends through a slot 32 in the sleeve 30.

What we claim is:

1. A frame for motor cycles or the like comprising a pair of steering heads and columns one on each side of the wheel to be steered, links secured to each end of each steering column and connected by tie-rods to form a pair of structures swinging about the steering columns, an axle for the said wheel pivotally mounted on the tie-rods and connecting one tie-rod to the other, and a link manipulated by the steering means pivotally connecting the tie-rods, said axle and link holding the tie-rods a distance apart different from that between the steering columns.

2. A frame for motor cycles or the like comprising a pair of steering heads and columns one on each side of the wheel to be steered, links secured to each end of each steering column and connected by tie-rods to form a pair of structures swinging about the steering columns, an axle for the said wheel pivotally mounted on the tie-rods by means of lugs sliding on the tie-rods against resilient load-carrying means, said axle connecting one tie-rod to the other, and a link manipulated by the steering means pivotally connecting the tie-rods, said axle and link holding the tie-rods a distance apart different from that between the steering columns.

3. A frame for motor cycles or the like comprising a pair of steering heads and columns one on each side of the wheel to be steered, links secured to each end of each steering column and connected by tie-rods to form a pair of structures swinging about the steering columns, an axle for the said wheel pivotally mounted on the tie-rods by means of lugs sliding on the tie-rods against load-carrying springs surrounding the tie-rods, said axle connecting one tie-rod to the other, and a link manipulated by the steering means pivotally connecting the tie-rods, said axle and link holding the tie-rods a distance apart different from that between the steering columns.

4. A frame for motor cycles or the like comprising a pair of steering heads and columns one on each side of the wheel to be steered, links secured to each end of each steering column and connected by tie-rods to form a pair of structures swinging about the steering columns, an axle for the said wheel pivotally mounted on the tie-rods by means of lugs sliding on the tie-rods against load carrying springs surrounding the tie-rods, said axle connecting one tie-rod to the other, rebound spring surrounding the tie-rods below the sliding lugs, and a link manipulated by the steering means pivotally connecting the tie-rods, said axle and link holding the tie-rods a distance apart different from that between the steering columns.

5. A frame for motor cycles or the like comprising in combination two complete frames placed side by side and connected by cross bracing, the front member of each frame forming a steering head and extending substantially from the handle bars to a point below the front axle, a steering column mounted in bearings in each steering head, links secured to each end of each steering column, tie-rods parallel to the respective steering columns rigidly connecting the outward ends of the links on each column, a link carrying the handle bars pivotally connecting the upper ends of the tie-rods and holding them a distance apart different from that of the steering columns, and lugs pivoted on the tie-rods and carrying the front axle.

6. A frame for motor cycles or the like comprising in combination two complete frames placed side by side and connected by cross bracing, the front member of each frame forming a steering head and extending substantially from the handle bars to a point below the front axle, a steering column mounted in bearings in each steering head, links secured to each end of each steering column, tie-rods parallel to the respective steering columns rigidly connecting the outward ends of the links on each column, a link carrying the handle bars pivotally connecting the upper ends of the tie-rods and holding them a distance apart different from that of the steering colums, and lugs carrying the front axle sliding on the tie-rods against load springs surrounding the rods.

7. A frame for motor cycles or the like comprising a pair of steering heads and columns one on each side of the wheel to be steered, links secured to each end of each steering column and connected by tie-rods to form a pair of structures swinging about the steering columns, an axle for the said wheel pivotally mounted on the tie-rods by means of lugs sliding against resilient load-carrying means within sleeves which surround the tie-rods and are pivotally mounted thereon by means of a bearing at each end, and a link manipulated by the steering means pivotally connecting the tie-rods, said axle and link holding the tie rods a distance apart different from that between the steering columns.

8. A frame for motor cycles or the like comprising a pair of steering heads and columns one on each side of the wheel to be steered, links secured to each end of each steering column and connected by tie-rods to form a pair of structures swinging about the steering columns, sleeves surrounding the tie-rods and pivotally mounted thereon by means of a bearing at each end, collars on the rods sliding against springs within the sleeves, lugs on the collars projecting through slots in the sleeves and carrying an axle for said wheel, and a link manipulated by the steering means pivotally connecting the tie-rods, said axle and link holding the tie-rods a distance apart different from that between the steering columns.

In testimony whereof, we have signed our names to this specification at 2 Harley Street, London, this 8th day of May, 1928.

FREDERICK JOHN OSBORN.
NORMAN F. WOOD.